(12) United States Patent
Mercure

(10) Patent No.: US 9,180,846 B2
(45) Date of Patent: Nov. 10, 2015

(54) TRAILER TONGUE CONNECTION UNIT

(76) Inventor: Roger Mercure, Mascouche (CA)

(*) Notice: Subject to any disclaimer, the term of this patent is extended or adjusted under 35 U.S.C. 154(b) by 43 days.

(21) Appl. No.: 13/640,927

(22) PCT Filed: Apr. 14, 2011

(86) PCT No.: PCT/CA2011/050198
§ 371 (c)(1),
(2), (4) Date: Oct. 12, 2012

(87) PCT Pub. No.: WO2011/127605
PCT Pub. Date: Oct. 20, 2011

(65) Prior Publication Data
US 2013/0026735 A1 Jan. 31, 2013

Related U.S. Application Data

(60) Provisional application No. 61/323,887, filed on Apr. 14, 2010.

(51) Int. Cl.
B60T 7/20 (2006.01)
B60D 1/06 (2006.01)
B60D 1/24 (2006.01)
B60D 1/58 (2006.01)

(52) U.S. Cl.
CPC ... B60T 7/20 (2013.01); B60D 1/06 (2013.01); B60D 1/24 (2013.01); B60D 1/242 (2013.01); B60D 1/58 (2013.01)

(58) Field of Classification Search
CPC .......... B60D 1/065; B60D 1/24; B60D 1/242; B60D 1/58; B60T 7/20

USPC .............. 280/428, 432, 446.1, 504, 510, 511; 188/3 R, 112 R
See application file for complete search history.

(56) References Cited

U.S. PATENT DOCUMENTS

| 1,378,749 | A | * | 5/1921 | Winn | 188/3 R |
| 1,720,882 | A | * | 7/1929 | Cadman | 280/420 |
| 1,980,015 | A | * | 11/1934 | Thompson | 280/421 |
| 2,000,999 | A | * | 5/1935 | Suchland | 188/112 R |
| 2,093,185 | A | * | 9/1937 | Bieber | 188/112 R |
| 2,198,159 | A | * | 4/1940 | Foley | 188/112 R |
| 2,232,755 | A | * | 2/1941 | Winn | 188/3 R |
| 2,253,791 | A | * | 8/1941 | Kline et al. | 188/119 |
| 2,399,746 | A | * | 5/1946 | Klaus et al. | 188/112 R |
| 2,489,117 | A | * | 11/1949 | Black | 280/420 |

(Continued)

FOREIGN PATENT DOCUMENTS

CA 2598319 A1 2/2009

Primary Examiner — Anne Marie Boehler
Assistant Examiner — Maurice Williams
(74) Attorney, Agent, or Firm — Norton Rose Fulbright Canada LLP

(57) ABSTRACT

A safety brake system for a trailer comprises a brake end having a brake unit adapted to be secured to a trailer and positioned to block movement of the trailer when actuated and an actuation end adapted to be secured to a front end of the trailer. The actuation end comprises a hitch ball coupler having a hand portion defining a concavity adapted to receive a hitch ball of a vehicle. It also comprises a mechanism operatively connected to the hitch coupler and displaceable with respect thereto. The mechanism comprises a probe plunger and a hitched position. The mechanism is connected to the brake unit for actuation of said brake unit. The safety brake system also comprises a biasing unit. A trailer assembly is also provided.

13 Claims, 10 Drawing Sheets

(56) References Cited

U.S. PATENT DOCUMENTS

| | | | | |
|---|---|---|---|---|
| 2,729,309 | A | * | 1/1956 | Mullin .................... 188/112 R |
| 2,853,317 | A | * | 9/1958 | Waddle ....................... 280/511 |
| 3,144,101 | A | * | 8/1964 | Hahn ...................... 188/112 R |
| 3,173,518 | A | * | 3/1965 | Sill ........................ 188/112 R |
| 3,832,501 | A | * | 8/1974 | Amnotte .................. 200/61.19 |
| 3,973,655 | A | * | 8/1976 | Mollard ...................... 188/328 |
| 4,239,252 | A | | 12/1980 | Huetsch et al. |
| 4,679,812 | A | * | 7/1987 | Byrnes ...................... 280/406.2 |
| 5,443,131 | A | * | 8/1995 | Bartlett ........................ 188/3 R |
| 5,464,078 | A | * | 11/1995 | Pittman .................... 188/112 R |
| 5,771,996 | A | * | 6/1998 | Marasco .................. 188/112 R |
| 7,806,240 | B2 | * | 10/2010 | Walstrom et al. ......... 188/112 R |
| 2002/0175496 | A1 | * | 11/2002 | Novakowski ................ 280/504 |
| 2003/0201141 | A1 | | 10/2003 | Frye |
| 2011/0303502 | A1 | * | 12/2011 | Mercure ...................... 188/2 D |
| 2012/0205894 | A1 | * | 8/2012 | Tindall ...................... 280/491.1 |

* cited by examiner

TRAILER TONGUE CONNECTION UNIT

CROSS-REFERENCE TO RELATED APPLICATION(S)

This patent application claims priority from U.S. provisional patent application 61/323,887, filed on Apr. 14, 2010, the specification of which is hereby incorporated by reference.

FIELD OF THE APPLICATION

The present application relates to trailers such as domestic trailers and, more particularly, to a safety brake system used when trailers are unhitched or accidentally detached from a vehicle to block the wheels of the trailer.

BACKGROUND OF THE ART

Large trailers, such as those used in the freight industries, are equipped with braking systems in order to ensure that the tractor and trailer combination has enough braking power to safely transit on roads. Some trailers are commonly equipped with air brakes that are actuated from the tractor, which air brakes automatically lock the wheels of the trailer when the latter is unhitched.

Smaller trailers, for instance domestic trailers or trailers used to tow recreational vehicles (e.g., boat, motorcycle, ATV, etc.), are seldom provided with a braking system in order to keep their costs low. Accordingly, the braking power is fully supplied by the vehicle towing the trailer. When the trailer is unhitched, random masses (e.g., log, plank, rock) are often wedged behind the wheels of the trailer so as to block movement of the trailer. This action of wedging is hazardous. Moreover, if the operator forgets to wedge a mass behind the wheels, the trailer might start moving if it is on a slope. With the inertia of the trailer and its contents, a moving trailer is hard to stop and may cause severe damages and/or injuries.

Also, some types of smaller trailers may have brake systems. The brake systems may operate with electric, pneumatic, hydraulic networks, among other possibilities. In most cases, the brake systems can only be actuated by actions from the vehicle towing the trailer.

SUMMARY OF THE APPLICATION

It is therefore an aim of the present application to provide a safety brake system for trailers that addresses issues associated with the prior art.

It is a further aim of the present application to provide a method for installing a safety brake system to a trailer of a vehicle.

Therefore, in accordance with a first embodiment of the present application, there is provided a safety brake system for a trailer comprising: a brake end comprising a brake unit adapted to be secured to a trailer and positioned to block movement of the trailer when actuated; an actuation end adapted to be secured to a front end of the trailer comprising: a hitch ball coupler comprising a hand portion defining a concavity adapted to receive a hitch ball of a vehicle, a mechanism operatively connected to the hitch coupler and displaceable with respect thereto, the mechanism comprising a probe plunger displaceable between an unhitched position in which the probe plunger penetrates inside the concavity free of the hitch ball, and a hitched position in which the probe plunger is displaced at least partially out of the concavity by contact with the hitch ball, the mechanism being connected to the brake unit for actuation of said brake unit when the probe plunger is in the unhitched state, and a biasing unit to bias the probe plunger to the unhitched state when the hitch coupler of the trailer is separated from the hitch ball of the vehicle to actuate the brake unit.

Further in accordance with the first embodiment, the safety brake system has an opening defined in a top portion of the hand portion for penetration of the probe plunger into the concavity.

Still further in accordance with the first embodiment, the mechanism of the safety brake system comprises an elongated member pivotally mounted at to the hitch ball coupler, with the probe plunger being secured to the elongated member.

Still further in accordance with the first embodiment, the elongated member of the safety brake system is a U-shaped bracket pivotally mounted at opposed ends to the hitch ball coupler.

Still further in accordance with the first embodiment, a lever operatively connected to the elongated member for concurrent movement is provided, the lever being manually displaceable to release brakes of the brake unit.

Still further in accordance with the first embodiment, a joining unit is provided, for joining a cable of the brake unit to at least one of the elongated member and of the lever, a portion of the joining unit being mounted to the hitch ball coupler to translate relative to the trailer, the joining unit being connected to the cable of the brake unit such that a translation of the portion of the joining unit actuates/releases the brakes of the brake unit.

Still further in accordance with the first embodiment, the joining unit comprises a rack block meshed with a pinion portion of one of the elongated member and of the lever.

Still further in accordance with the first embodiment, a cable block releasably engaged to the rack block is provided, the cable block being mounted to the hitch ball coupler to translate relative to the trailer, the cable block being connected to the cable of the brake unit such that a translation of the cable block actuates/releases the brakes of the brake unit.

Still further in accordance with the first embodiment, a safety block and biasing component are provided, the safety block being operatively mounted to the hitch ball coupler to bias the cable block into engagement with the rack block.

Still further in accordance with the first embodiment, there is provided a safety cable connected at a first end to the safety block and adapted to be connected at a second end to the vehicle, such that a pulling force on the safety cable displaces the safety block out of biasing the cable block from the rack block to actuate the brakes.

Still further in accordance with the first embodiment, the safety block is mounted to the hitch ball coupler to translate relative to the trailer in a direction angled relative to a direction of the cable block.

In accordance with a second embodiment of the present application, there is provided a trailer assembly comprising: a trailer body supported by wheels, and a trailer tongue; and the safety brake system as defined in any one of claims 1 to 11, the hitch ball coupler being mounted to the trailer tongue.

Further in accordance with the second embodiment, the brake of the trailer assembly is shaped to block at least one of the wheels of the trailer.

DESCRIPTION OF THE PREFERRED EMBODIMENTS

Figure 4:
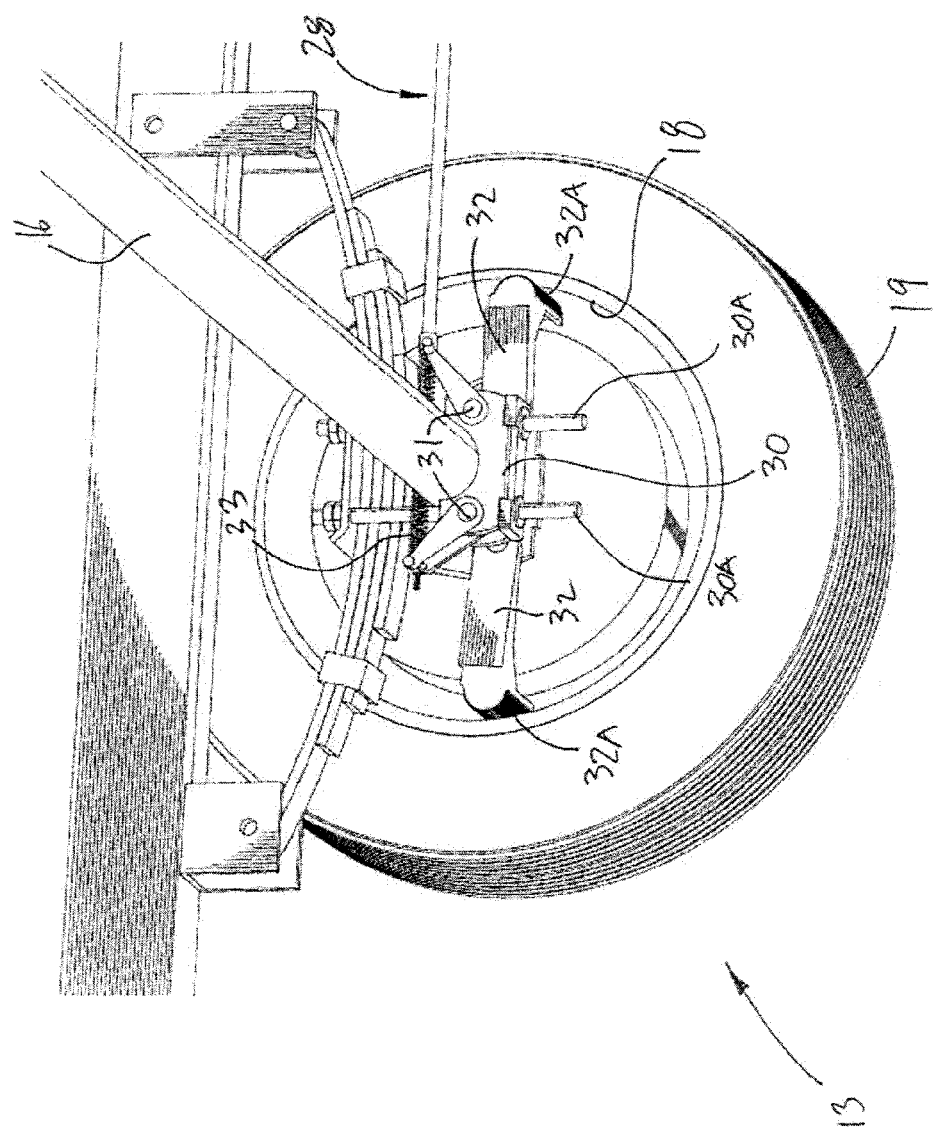
FIG. 4 is a perspective view of the braking end of FIG. 3, in the braking state.
Figure 5:
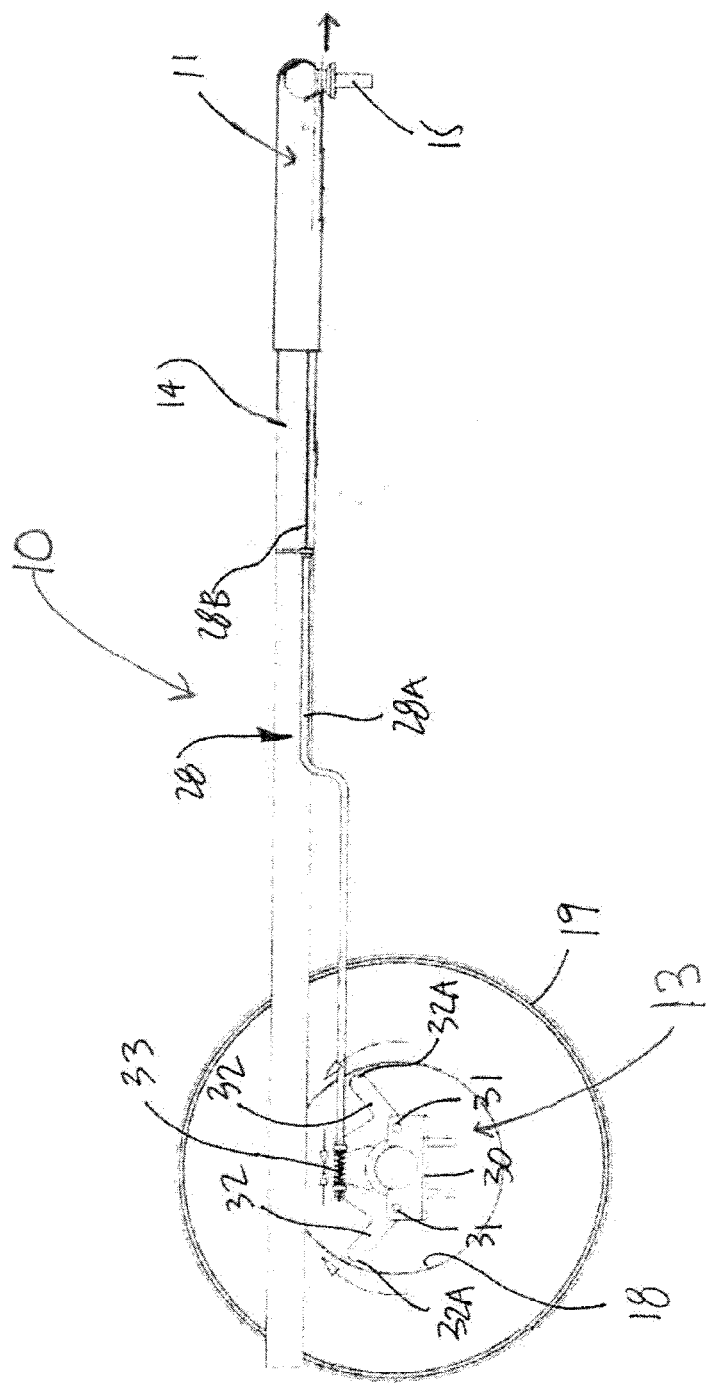
FIG. 5 is a schematic view of the safety brake system in the hitched state.
Figure 6:
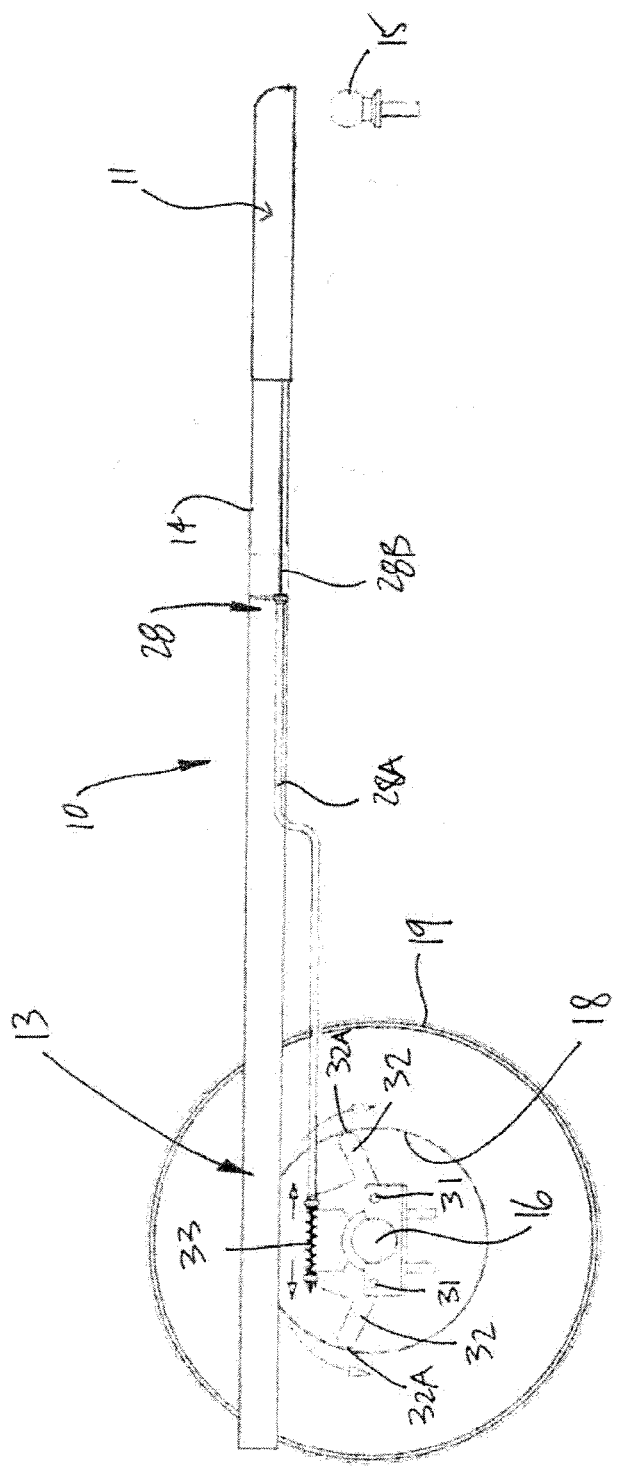
FIG. 6 is a schematic view of the safety brake system in the braking state.

Referring to the drawings, and more particularly to FIGS. 5 and 6, a front end of a trailer is generally illustrated at 10. An actuation end of the safety brake system of the present disclosure is illustrated at 11 in FIGS. 1-2, whereas a brake end of the safety brake system is illustrated at 13 in FIGS. 3-4.

The trailer 10 is used to carry loads and is towed by a vehicle.

The actuation end 11 is used to actuate the brake system or wheel blocking system and includes a hitch coupler 12.

The brake end 13 performs the braking action to block the wheels of the trailer 10.

Figure 3:
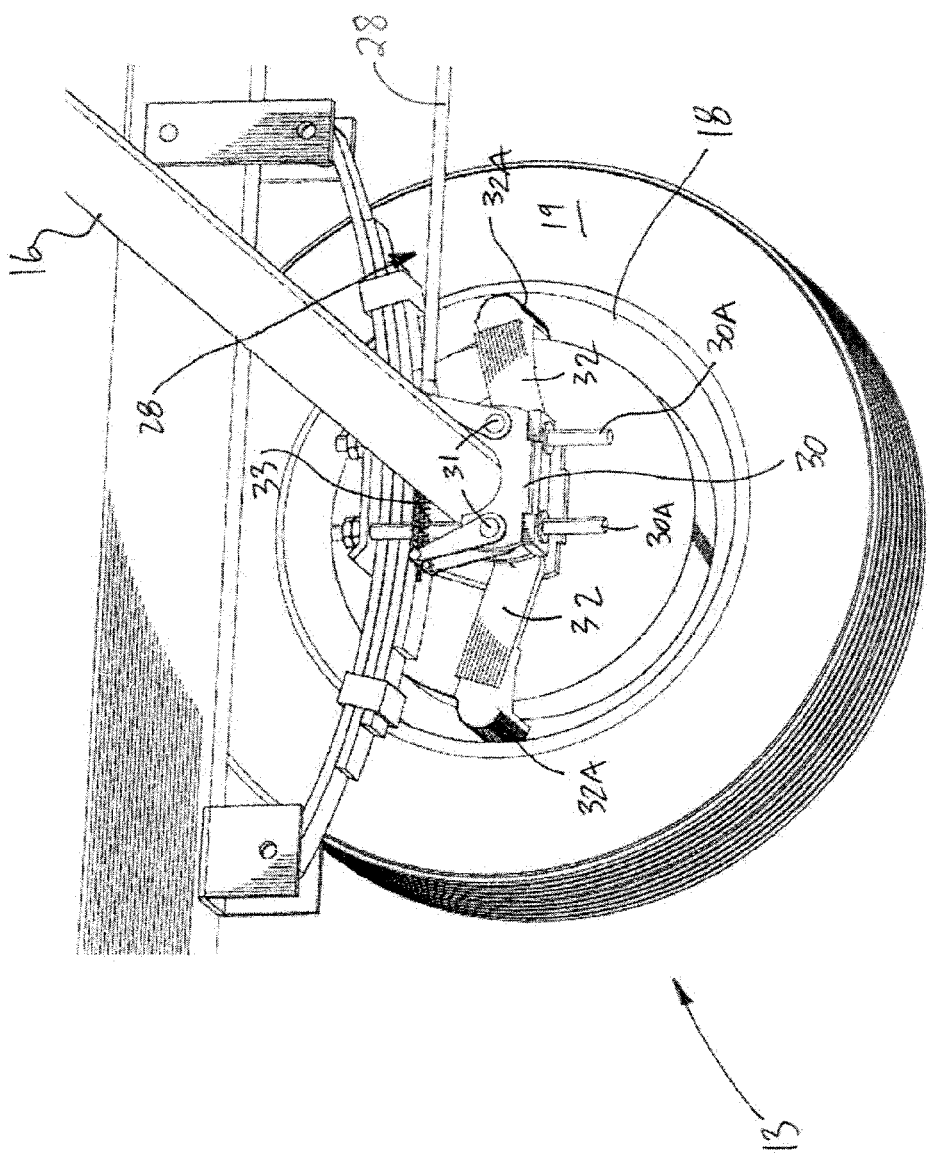
FIG. 3 is a perspective view of a braking end of the safety brake system in accordance with an embodiment of the present application, in the hitched state.

Referring to FIGS. 5-6, the actuation end 11 is mounted to a tongue 14 of the trailer. It is well known that the tongue 14 is the interface between the trailer and the vehicle towing the trailer 10. The hitch coupler 12 of the actuation end 11 engages with a hitch 15 on the vehicle, namely a ball hitch in the illustrated embodiment. As seen in FIG. 3, the brake end 13 of the safety brake system is mounted to the axle 16 of the trailer 10, so as to act on the rims 18 of the wheels 19 of the trailer 10.

Referring to FIG. 5, the actuation end 11 of the safety brake system is shown mounted to the trailer 10 but may alternatively be mounted on the vehicle or on the hitch of the vehicle. In the embodiment shown in FIG. 1, the hitch coupler 12 of the actuation end 11 is commonly known as a hitch ball coupler. The hitch coupler 12 has a rear portion 20 which is releasably or permanently secured to the tongue 14 of the trailer 10. The rear portion 20 of the hitch coupler 12 may be secured to the tongue 14 of the trailer using various different methods and/or configurations, for example using male and female members with fasteners, such as bolts, passing therethrough. In another embodiment, the actuation end 11 may include a support plate and a pair of U-shaped connectors, with the U-shaped connectors strapping the support plate to the tongue 14, by way of nuts or other appropriate fasteners.

The hitch coupler 12 of the actuation end 11 includes a lever 17 thereon connected to a clamp (not shown) located on the underside thereof and a hand portion 21 located at the front thereof. The lever 17 and the clamp are conventional in the art and may be used to releasably secure the hitch 15 of the vehicle pulling the trailer 10 inside the hand portion 21. Although the hitch coupler 12 is described as including a lever 17 and clamp, in other embodiments, the hitch coupler 12 may alternatively include other means known in the art for attaching a trailer to a vehicle hitch, for example the hitch coupler 12 may include a hand wheel, a toggle, a lunette ring, etc. The hand portion 21 defines a concavity for receiving the hitch ball 15, and includes a hole 21a (i.e., opening) therethrough, which in the embodiment shown, is formed on an upper surface thereof. Although the hole 21a is shown on a top portion of the hand portion 21, it may be laterally located as well.

Figure 1:
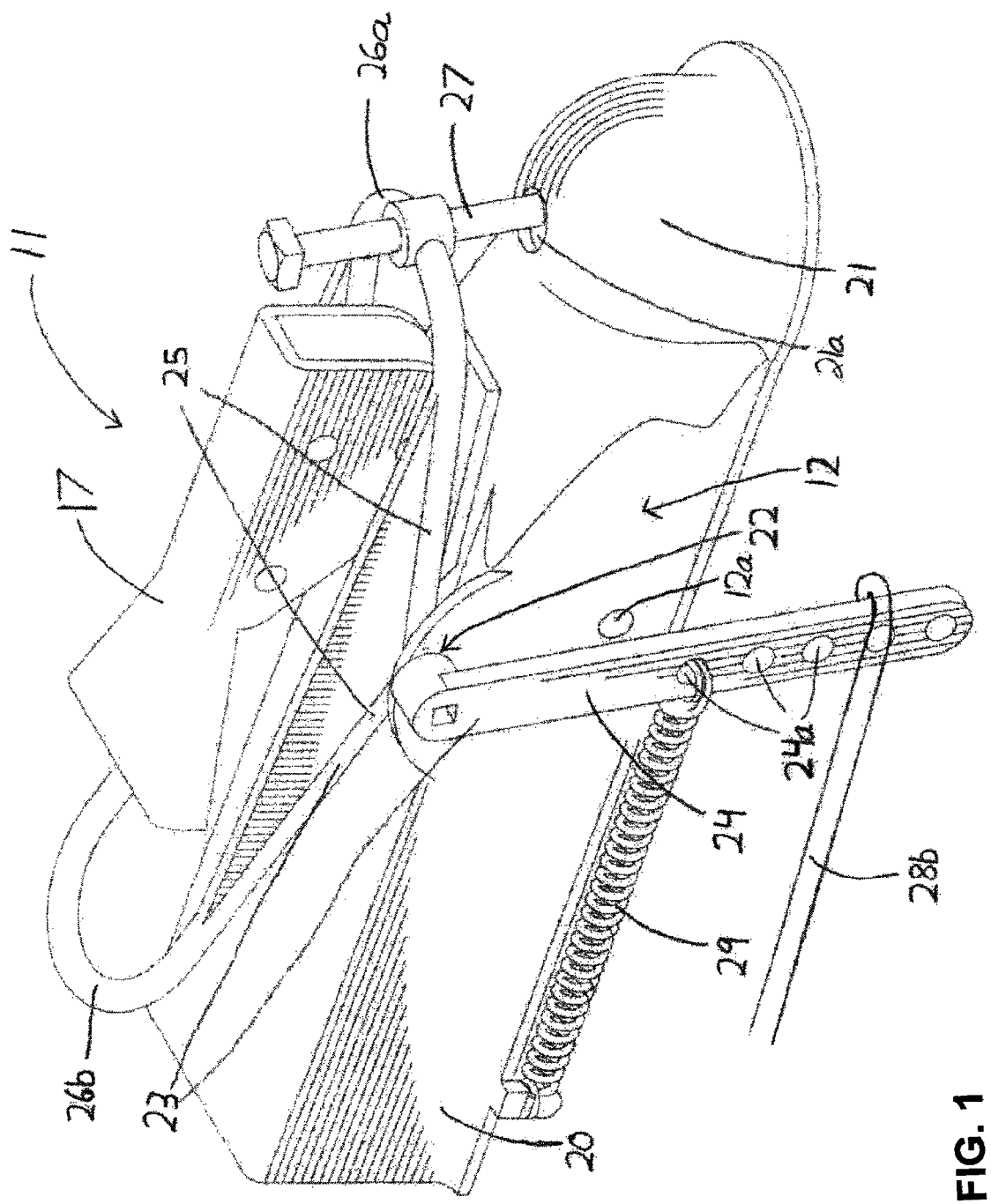
FIG. 1 is a top perspective view of an actuation end of a safety brake system in accordance with an embodiment of the present application, in a hitched state on a tongue of a trailer.

As seen in FIG. 1, the hitch coupler 12 has two opposed pivots 22 (only one of which is shown), pivotally supporting opposed ends of an actuation member 23. The actuation member 23 comprises a link 24 supported by one of the pivots 22 and an elongated member 25 supported by both of the pivots 22. The link 24 and the elongated member 25 are operatively connected such that as the actuation member 23 rotates, the link 24 and the elongated member 25 rotate similarly together.

The link 24 is supported by one of the pivots 22 at one end and, in proximity of another end, includes at least one hole 24a therein. In the embodiment shown, the link 24 includes a plurality of holes 24a, each hole 24a being located a different distance from the pivot 22.

The elongated member 25 includes a front portion 26a and a rear portion 26b. In the embodiment shown, the front and rear portions 26a, 26b form arcuate shapes in the elongated member 25. The front portion 26a of the elongated member 25 accommodates a probe 27 which is sufficiently elongated to be able to enter the opening 21a of the hand portion 21 when the cavity inside the hand portion 21 is at least substantially empty.

The actuation end 11 additionally includes a biasing unit 29 connected at one end to the hitch coupler 12 and at an opposite end, to the link 24. The biasing unit 29 biases the link 24 towards the rear, i.e. in a clockwise direction, which, due to the connection between the link 24 and the elongated member 25, additionally biases the probe 27 towards the hole 21a of the hand portion 21 of the hitch coupler 12.

Figure 2:
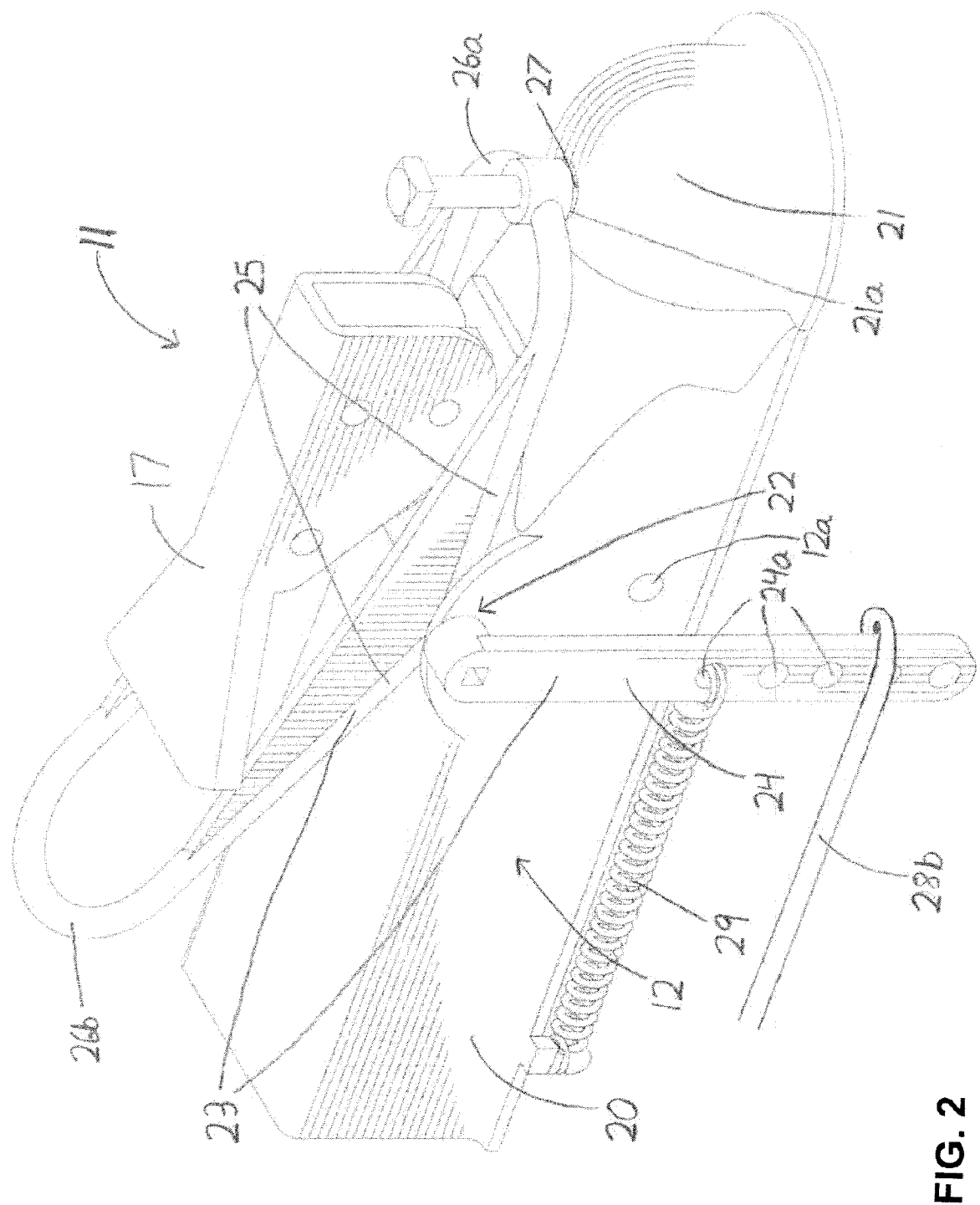
FIG. 2 is a top perspective view of the actuation end of FIG. 1, in a braking state.

As seen in FIG. 1, the safety brake system is in a hitched state when the hitch coupler 12 is attached to the hitch 15 of a vehicle. When the safety brake system is in the hitched state, the hitch 15 of the vehicle is located inside the cavity of the hand portion 21, and as such, the probe 27 cannot extend inside the hole 21a and therefore remains outside of the cavity of the hand portion 21. Moreover, when the safety brake system is in a hitched state, the biasing unit 29 biases the probe 27 against the hitch 15 located inside the hand portion 21 and therefore towards the braking state. As seen in FIG. 2, the safety brake system is in a braking state when the probe 27 extends through the hole 21a and into the cavity of the hand portion 21.

Although the member 25 has been described as elongated, in other embodiments, the member 25 need not be elongated and may simply include a probe operatively connected to the link 24. The front portion 26a may accommodate the probe 27 according to various configurations, for instance, the probe 27 may form a part of the front portion 26a, or the probe 27 may be attached thereto, etc. In the embodiment shown, the probe 27 has the shape of a bolt, but in other embodiments, the probe 27 may be any number of shapes so long as it is capable of extension into the hand portion 21 of the hitch coupler 12.

In another embodiment, the link 24 and the elongated member 25 need not be part of a same actuation member, but may be two separate parts which are operatively connected one to the other.

A cable 28 interrelates the link 24 to the brake end 13. In the embodiment shown, the cable 28 is attached to one of the holes 24a of the link 24, although in other embodiments, the cable 28 may be attached to the link 24 through different means known in the art, such as with a fastener or other attachments. The cable 28 transmits movements of the link 24 to the brake of the brake end 13. In an embodiment, the cable 28 is of the type used in bicycle brakes, featuring a housing 28A accommodating a metallic wire 28B, with the metallic wire 28B moving axially into the housing 28A. As is seen in FIG. 5, the housing 28A is connected to the tongue 14, whereas the metallic wire 28B is connected to the link 24.

According to another embodiment, the actuation end 11 is connected to the brake end 13 by electrical wires. The movement of the link 24 to the braking state is used to trigger a limit switch that sends a signal to the brake unit of the brake end 13. The brake unit may be electrically powered, or the electrical signal from the limit switch may be converted to mechanical, hydraulic, pneumatic forces to actuate the brake unit.

Referring to FIGS. 3 and 4, the brake end 13 has an axle mount 30 that is connected to the axle 16 so as to operatively position the brake end 13 opposite the wheel 19. In an embodiment, the axle mount 30 has a base placed against the axle 16, and secured thereto by bolts 30A. Alternatively, the axle mount 30 may have a support plate and U-shaped connectors, with the U-shaped connectors strapping the axle mount 30 to the axle 16, for instance with fasteners such as nuts or the like.

The axle mount 30 has pivots 31. A pair of arms 32 are pivotally connected to the support plate of the axle mount 30 by the pivots 31. The arms 32 have braking surfaces 32A that are adapted to contact the interior of the rim 18 of the wheel 19 in a braking action of the brake system.

A spring 33 is placed between the arms 32 away from the braking surfaces 32A, and biases the arms 32 away from one another. Accordingly, the spring 33 biases the arms 32 toward a pressing position against the rim 18. The contact between the braking surfaces 32A and the rim 18 will cause braking friction acting against any rotation of the wheels 19. According to an embodiment, the arms 32 of a same wheel act separately, with one arm 32 for a clockwise rotation, and another arm 32 for a counterclockwise rotation. In FIGS. 5 and 6, the right-hand side arm 32 blocks the wheel 19 rotating clockwise, while the left-hand side arm 32 blocks the wheel 19 rotating counterclockwise.

The position of the pivots 31 and the length of the arms 32 is such that the pivoting courses of the braking surfaces 32A are limited at one end by the rim 18. Therefore, when the safety brake system is in the braking state, the spring 33 will bring one of the arms 32 into contact with the rim 18. As the arm 32 rotates in the same direction as the rim 18, the rim 18 will draw the arm 32 therewith, thereby increasing the blocking action of the arm 32 on the rim 18. As the forces involved in braking are substantial, the components of the brake end must be sized to operate under and sustain such forces.

In similar fashion to a bicycle brake system, the wire 28B of the cable 28 is connected to the arms 32. Accordingly, a release of the wire 28B from the actuation end 11 (FIG. 1) (i.e., loosening the tension in the wire 28B) will result in one of the braking surfaces 32A contacting the rim 18, by the action of the spring 33. The biasing unit 29 biasing the link 24 at the actuation end 11 provides additional force to that of the spring 33. This ensures that the brake system comes into contact with the wheel or wheels 19 when the trailer 10 is unhitched.

Other types of brakes may be used as well. For instance, the brake unit may act with the ground instead of with the wheels.

Therefore, the safety brake system operates in the following manner. When the trailer 10 is unhitched, the link 24 is biased by the biasing unit 29 such that the probe 27 extends into the hole 21a and into the cavity of the hand portion 22 in which a vehicle hitch component would be, as shown in FIG. 5. This results in the link 24 rotating clockwise and so, tension loosens in the wire 28B, causing the arms 32 to move away from one another, and one of the braking surfaces 32A to come into contact with the rim 18. Alternatively, the movement of the probe 27 to the braking state (FIG. 2) may actuate any existing braking system of the trailer 10 (e.g., hydraulic, electric, pneumatic, mechanical).

When the trailer 10 is hitched, the probe 27 moves to the position of FIG. 1, thereby tightening the wire 28B. As a result, the braking surfaces 32A are separated from the rims 18, thereby unlocking the wheels 19, as seen in FIGS. 3 and 5.

Therefore, when the trailer 10 is unhitched, the brake system blocks the wheels. If manual operation is desired, the rear portion 26b of the elongated member 25 may be used as a handle in order to rotate the actuation member 23. For instance, the brakes may be manually actuated when the unhitched trailer 10 must be displaced.

It is considered to provide a pair of the brake ends 13 for a single one of the actuation end 11. Although not shown, each brake end 13 may be positioned on its own wheel 19, while the cables 28 are both actuated from the same actuation end 11.

It is considered to provide the safety brake system in a retrofit kit that can be used with existing trailers, or existing brake systems of trailers. The safety brake system described above is mounted to common components of a trailer 10. The safety brake system may adopt other configurations as a function of the trailers that will use it. For instance, the brake end 13 may be mounted to a suspension, or to the trailer frame, and may block other parts of the wheel. Similarly, the actuation end 11 is not restricted to being mounted to the tongue 14, and may be mounted on the vehicle as well.

It may be desired to keep the arms 32 locked in the braking position. For instance, when the trailer 10 is unhitched, it may be desired to block the wheels of the trailer 10. Accordingly, locking means, such as the holes 24a in the lever 24 and holes 12a in the tongue 12 can be used with a lock, to prevent movement of the link 24. The lock may be used to block the wheels with the arms 32, to prevent the trailer 10 from being hitched, and thus prevent theft. In such a case, the cable 28 is preferably concealed in the frame of the trailer to avoid tampering.

The safety brake system may be provided with any single one of the handle (rear portion 26b) of the actuation member 25, the probe 27, or any combination thereof. For instance, the safety brake system may be provided solely with a manually actuated actuation member 25, or alternatively with the addition of the probe 27.

The probe 27 is illustrated in FIG. 1 for use with a standard ball hitch coupler 12. It is however considered to design a probe 27 and/or an actuation end 11 for use with any other type of hitch system. For instance, the actuation end 11 may be designed for use with a fifth-wheel coupling system, or any other type of system.

In another embodiment, the safety brake system is designed to apply more braking power to one of the two wheels of the trailer 10. For instance, more braking power may be applied to the right-hand wheel of the trailer 10, to cause a right-hand path of movement to the trailer 10. It is known that in most countries the shoulder is on the right side of the road, whereby the right-hand path would safely direct the trailer 10 to the shoulder, as opposed to the opposing lane of incoming vehicles. Alternatively, the braking power may be greater on the left-hand wheel for countries in which the shoulder is on the left-hand side of the road. In order to provide more braking power on one of the wheels, the clearance between the braking surfaces 32A and the rim 18 are smaller for one of the two rims 18.

Furthermore, in order to provide a greater or a lesser amount of loosening in the metallic wire 28b, the metallic wire 28b may be attached to any one of the holes 24a of the link 24 in order to control the loosening thereof. It is understood that as the link 24 rotates about the pivot 22, the metallic wire 28b will translate a greater distance the further it is attached from the pivot 22 on the link 24.

In another embodiment, the actuation member 23 may include two links 24, each link 24 being attached to an opposed pivot 22 of the hitch coupler 12. Each of the two links may be attached to a different biasing unit 29 and to a different metallic wire 28b for controlling opposed sets of wheels 19 of the trailer 10. As such, two opposed sets of wheels may be controlled with one safety brake system using two different links attached thereto, as opposed to using only one link. Alternatively, the two links may both be attached to the same wheels 19, and one of the links 24 may act as a backup system should the other of the two links 24 fail.

Figure 7:
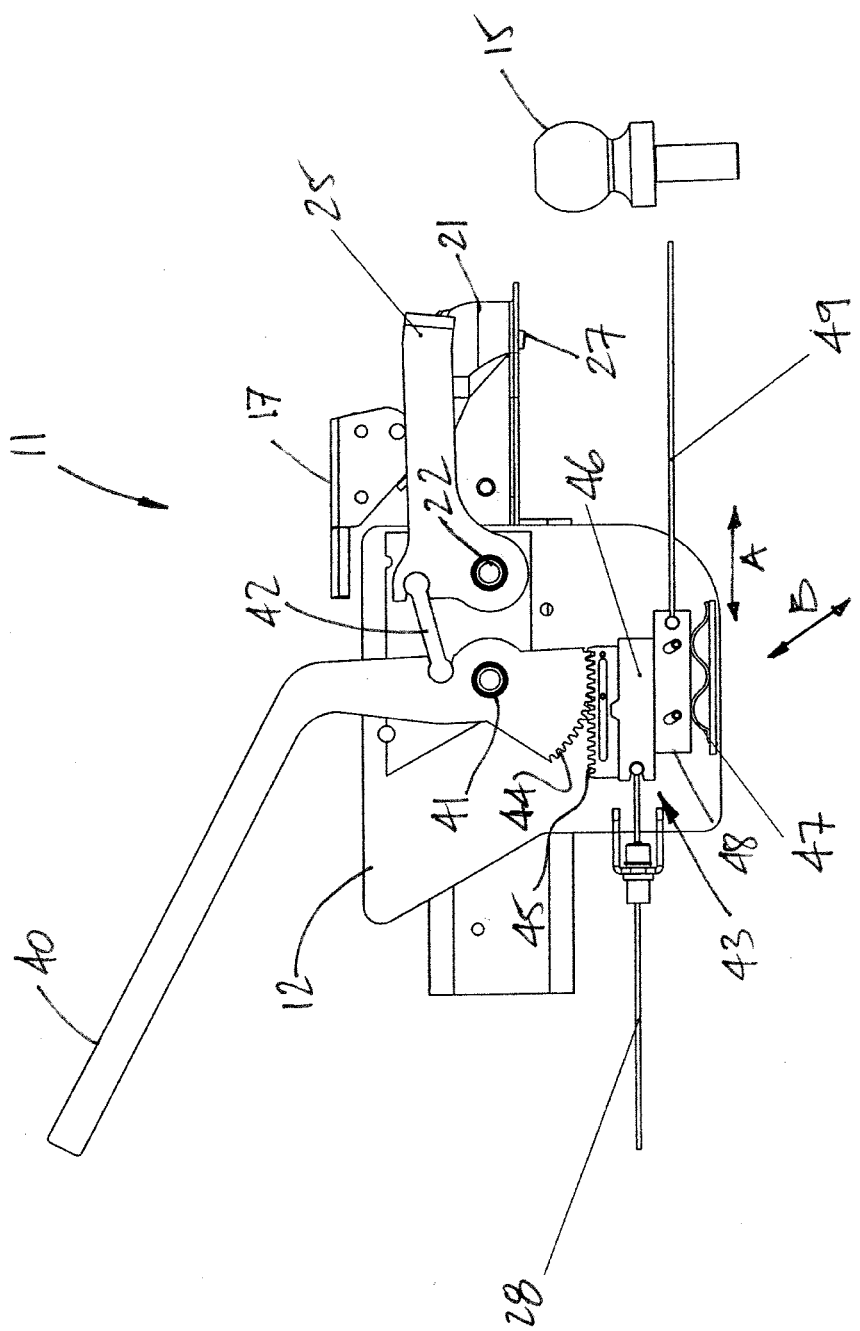
FIG. 7 is a schematic side view of an actuation end of a safety brake system in accordance with another embodiment of the present application, in an unhitched state on a tongue of a trailer.
Figure 8:
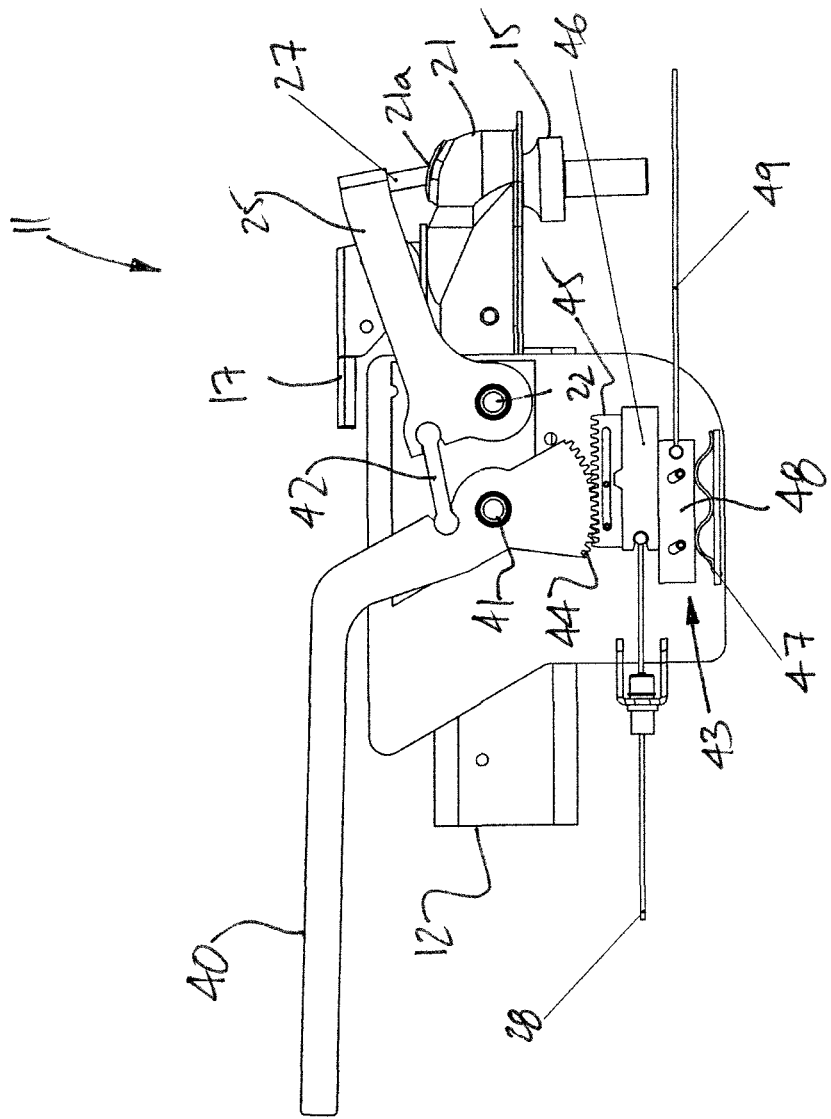
FIG. 8 is a schematic side view of the actuation end of FIG. 7, in a hitched state.
Figure 9:
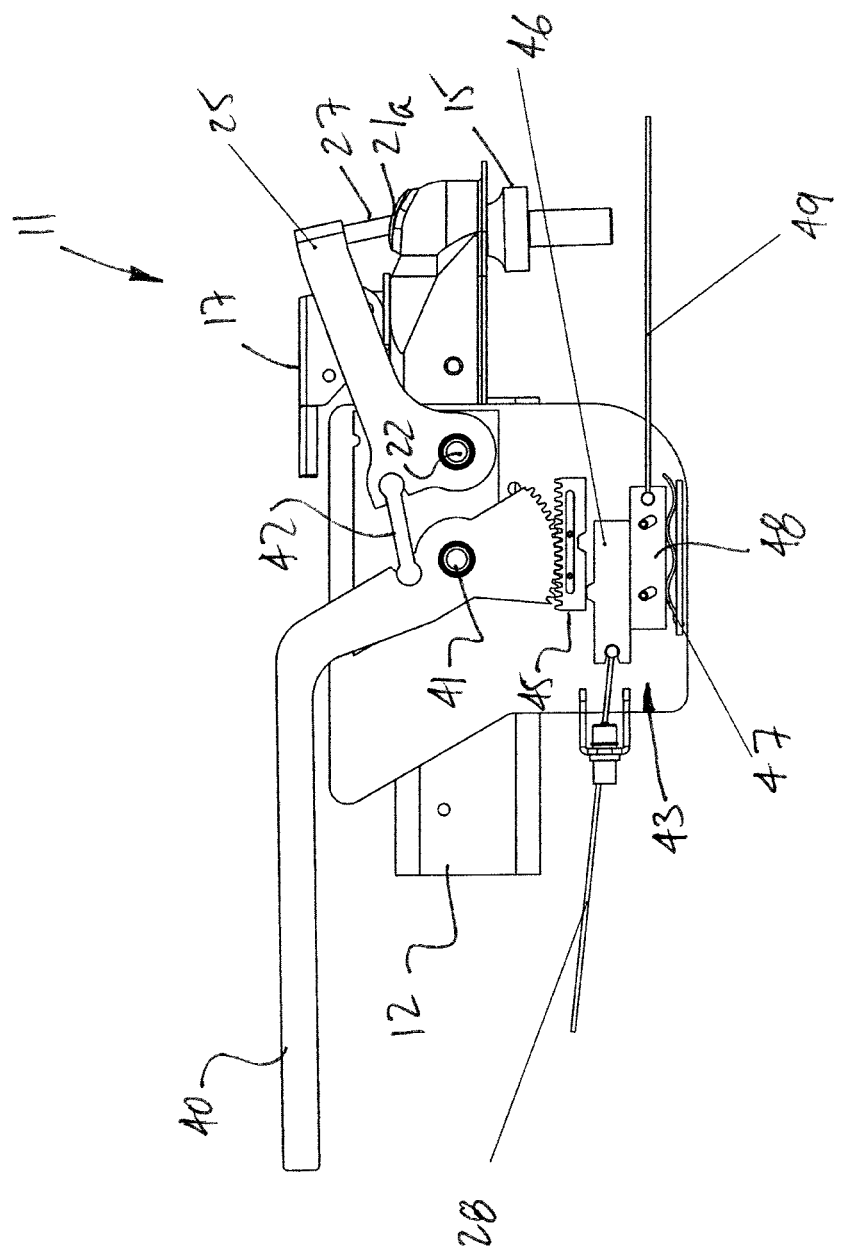
FIG. 9 is a schematic side view of the actuation end of FIG. 7, in a safety brake release.

Referring to FIGS. 7 to 9, an alternative embodiment of the actuation end 11 of the safety brake system is illustrated. The actuation end 11 of FIGS. 7 to 9 shares some components with the actuation end of FIGS. 1 and 2, whereby like components will bear like reference numerals.

In similar fashion to the actuation end 11 of FIGS. 1 and 2, the actuation end 11 of FIGS. 7 to 9 has a hitch ball coupler 12, with a hand portion 21 and a hole 21a. The actuation end 11 of FIGS. 7 to 9 may be of the retrofit kind, and is thus retrofitted to existing trailers with hand-type hitch couplers, which must be machined to allow a probe plunger 27 to penetrate into an interior of the hand portion 21. Accordingly, the periphery of the hole 21a may be reinforced for instance by the addition of a structural ring, to ensure that the hand portion 21 has the required structural integrity, despite the hole 21a therein. The structural ring may be welded, glued, brazed to the hand portion 21, among other possibilities.

In FIGS. 7-9, the elongated member 25, at the front end of which is the probe plunger 27, is pivotally connected to a structural part of the trailer 10 (e.g., hitch coupler 12, tongue 14), by way of pivots 22. The elongated member 25 is shown as being a U-shaped bracket, with opposite ends connected to the pivots 22. A lever 40 is also pivotally connected to a structural part of the trailer 10, about pivots 41. The elongated member 25 and the lever 40 are interconnected by joining link 42, whereby movement of the elongated member 25 causes a movement of the lever 40, and vice-versa.

The lever 40 is interfaced with the cable 28 via a joining unit 43. The joining unit 43 is operatively connected to a structural component of the tongue, of the hitch coupler, of the trailer, etc, so as to translate in directions A. The lever 40 has a pinion portion 44 meshed with a rack block 45 of the joining unit 43. Accordingly, a rotation of the lever 40, caused by manual action on the lever 40 or by the release/insertion of the hitch ball from/into the hand portion 21, will be converted to a translation of the joining unit 43 along directions A.

The rack block 45 is joined to a cable block 46 by mating surfaces as schematically illustrated in FIGS. 7-9, and therefore translates concurrently with the cable block 46. The cable block 46 is connected to the cable 28, whereby the concurrent translating movement of the rack block 45 and the cable block 46 will cause a pulling/releasing action on the cable 28.

Figure 10:
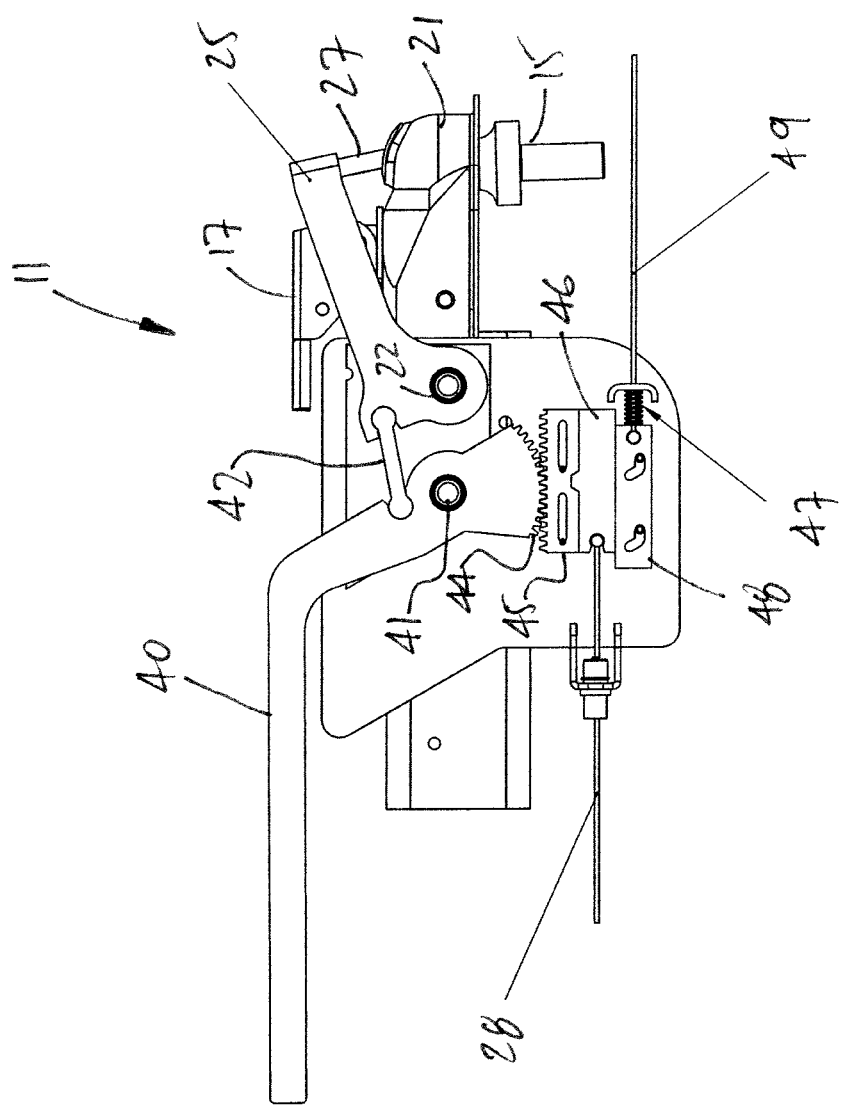
FIG. 10 is a schematic side view of the actuation end of FIG. 7, with a coil spring.

The rack block 45 and the cable block 46 are matingly engaged to one another as a result of a biasing action from biasing component 47. The biasing component 47 is illustrated as being a blade spring in FIGS. 7-9, but may be any appropriate type of biasing component, such as a coil spring in FIG. 10. Safety block 48 transmits the biasing action of the biasing component 47 to the cable block 46, whereby the cable block 46 remains engaged with the rack block 45 under normal operating conditions.

It is observed that the safety block 48 is operatively mounted to the structure of the trailer so as to be displaceable along directions B, generally angled relative to directions A. Accordingly, a pulling action on safety cable 49 will displace the safety block 48 against the biasing action to a downward position, allowing the cable block 46 to disengage from the rack block 45. In doing so, the biasing action of the brakes will release same, as the cable 28 will no longer be retained by the actuation end 11.

Now that the various components have been generally described, an operation of the actuation end 11 of FIGS. 7 to 9 follows.

As shown in FIG. 7, the hitch coupler 12 is not coupled to the hitch ball 15. Thus, the probe plunger 27 is biased into the hand portion 21 by the biasing components in the brake end 13 (among numerous biasing configurations), or by gravity. Therefore, no pulling action of sufficient magnitude to release the brakes is exerted on the cable 28.

As shown in FIG. 8, the brakes are released by a pulling action on the cable 28. The pulling action may be caused by either one of (1) a manual action on the lever 40, or of (2) a hitch ball 50 being coupled to the hitch coupler 12. In the latter case, the hitch ball 15 enters in the cavity of the hand portion 21, thereby progressively pushing the probe plunger 27 out of the hand portion 21. The rotation movements of (1) and/or (2) will be converted to a translation of the joining unit 43, causing a pulling action on the cable 28, and thus a release of the brakes. Once the hand portion 21 is fitted onto the hitch ball 15, the lever 17 is handled to clamp the hand portion 21 to the hitch ball 15.

If the trailer is subsequently unhitched, or if the lever 40 is released, the brakes will be activated for instance by the biasing components in the brake end 13, with the probe plunger 27 plunging into the hand portion 21.

In the event that the trailer detaches from the towing vehicle due to a breakage of the hitch, with the hitch 15 ball remaining engaged into the hitch coupler 12, the safety cable 49, connected to the vehicle at a front end, will jerk the safety block 48 to the position of FIG. 9. As a result, the cable block 46 will disengage from the rack block 45, causing a release of the brakes.

The mechanism described for FIGS. 7-10 interconnects the probe plunger 27 to the cable 28, for transmission of movement from one to the other. Accordingly, the brakes will be released proportionally to the depth of penetration of the hitch ball 15 in the hand portion 21 of the hitch ball coupler 12. If the safety brake system is well calibrated, the brakes will thus only be completely released once the hitch ball 15 is fully inserted in the hand portion 21, as a result of the probe plunger 27 contacting the hitch ball 15 and disengaging the brakes proportionally.

Other configurations are contemplated as well. For instance, the safety brake system may not have the lever 40, with the elongated member 25 meshed to the joining unit 43. However, the lever 40 is advantageously provided to allow the selective release of the brakes when the trailer is unhitched.

Moreover, alternatives to the meshing engagement between the lever 40 and the joining unit 43 are considered as well. For instance, the lever 40 may be frictionally engaged to the joining unit 43.

The invention claimed is:

1. A safety brake system for a trailer comprising:
a brake end comprising a brake unit adapted to be secured to a trailer and positioned to block movement of the trailer when actuated;
an actuation end adapted to be secured to a front end of the trailer comprising:
a hitch ball coupler comprising a hand portion defining a concavity adapted to receive a hitch ball of a vehicle,
a mechanism operatively connected to the hitch coupler and displaceable with respect thereto, the mechanism comprising a probe plunger displaceable between an unhitched position in which the probe plunger penetrates inside the concavity free of the hitch ball, and a hitched position in which the probe plunger is displaced at least partially out of the concavity by contact with the hitch ball, the mechanism being directly connected to the brake unit, the mechanism transmitting movement of the probe plunger to the brake unit so as to actuate said brake unit when the probe plunger moves to the unhitched state, the mechanism transmitting movement of the probe plunger to the brake unit so as to release said brake unit when the hitch bail is received in the hitch ball coupler to move the probe plunger to the hitched state and
a biasing unit to continuously bias the probe plunger toward the unhitched state, whereby the probe plunger automatically penetrates the concavity when the hitch coupler of the trailer is separated from the hitch ball of the vehicle to actuate the brake unit.

2. The safety brake system according to claim 1, wherein an opening is defined in a top portion of the hand portion for penetration of the probe plunger into the concavity.

3. The safety brake system according to claim 1, wherein the mechanism comprises an elongated member pivotally mounted at to the hitch ball coupler, with the probe plunger being secured to the elongated member.

4. The safety brake system according to claim 3, wherein the elongated member is a U-shaped bracket pivotally mounted at opposed ends to the hitch ball coupler.

5. The safety brake system according to claim 3, wherein the mechanism further comprises a lever operatively connected to the elongated member for concurrent movement, the lever being manually displaceable to release brakes of the brake unit.

6. The safety brake system according to claim 3, wherein the mechanism further comprises a joining unit for joining a cable of the brake unit to at least one of the elongated member and of the lever, a portion of the joining unit being mounted to the hitch ball coupler to translate relative to the trailer, the joining unit being connected to the cable of the brake unit such that a translation of the portion of the joining unit actuates/releases the brakes of the brake unit.

7. The safety brake system according to claim 6, wherein the joining unit comprises a rack block meshed with a pinion portion of one of the elongated member and of the lever.

8. The safety brake system according to claim 7, wherein the joining unit further comprises a cable block releasably engaged to the rack block, the cable block being mounted to the hitch ball coupler to translate relative to the trailer, the cable block being connected to the cable of the brake unit such that a translation of the cable block actuates/releases the brakes of the brake unit.

9. The safety brake system according to claim 8, further comprising a safety block and biasing component, the safety block being operatively mounted to the hitch ball coupler to bias the cable block into engagement with the rack block.

10. The safety brake system according to claim 9, further comprising a safety cable connected at a first end to the safety block and adapted to be connected at a second end to the vehicle, such that a pulling force on the safety cable displaces the safety block out of biasing the cable block from the rack block to actuate the brakes.

11. The safety brake system according to claim 9, wherein the safety block is mounted to the hitch ball coupler to translate relative to the trailer in a direction angled relative to a direction of the cable block.

12. A trailer assembly comprising:
a trailer body supported by wheels, and a trailer tongue; and
the safety brake system as defined in any one of claims 1 to 11, the hitch ball coupler being mounted to the trailer tongue.

13. The trailer assembly according to claim 12, wherein the brake is shaped to block at least one of the wheels of the trailer.

* * * * *